United States Patent
Meyer et al.

(10) Patent No.: US 10,594,829 B2
(45) Date of Patent: Mar. 17, 2020

(54) CLOUD WORKLOAD PROXY AS LINK-LOCAL SERVICE CONFIGURED TO ACCESS A SERVICE PROXY GATEWAY VIA A LINK-LOCAL IP ADDRESS TO COMMUNICATE WITH AN EXTERNAL TARGET SERVICE VIA A PRIVATE NETWORK

(71) Applicant: AT&T Intellectual Property I, L.P., Atlanta, GA (US)

(72) Inventors: Frederick Henry Meyer, Oakhurst, NJ (US); Edward Hope, Forked River, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 140 days.

(21) Appl. No.: 15/603,639

(22) Filed: May 24, 2017

(65) Prior Publication Data
US 2018/0343316 A1 Nov. 29, 2018

(51) Int. Cl.
*H01L 29/08* (2006.01)
*H04L 29/08* (2006.01)
*H04L 29/12* (2006.01)

(52) U.S. Cl.
CPC ...... *H04L 67/2895* (2013.01); *H04L 67/2809* (2013.01); *H04L 61/2038* (2013.01); *H04L 61/2092* (2013.01); *H04L 61/2514* (2013.01)

(58) Field of Classification Search
CPC . H04L 67/2895; H04L 61/2514; H04L 67/10; H04L 67/2809; H04L 61/2092; H04L 61/2038
See application file for complete search history.

(56) References Cited

U.S. PATENT DOCUMENTS 7,058,973 B1 * 6/2006 Sultan ............... H04L 29/12009
709/217
7,107,360 B1 * 9/2006 Phadnis ............ H04L 29/12367
709/239

(Continued)

OTHER PUBLICATIONS

Liu et al., "Software-Defined Fragmentation-Aware Elastic Optical Networks Enabled by OpenFlow," 39th European Conference and Exhibition on Optical Communication (ECOC 2013), Sep. 22-26, 2013.

(Continued)

*Primary Examiner* — Daniel C. Murray
(74) *Attorney, Agent, or Firm* — Hartman & Citrin LLC

(57) ABSTRACT

Concepts and technologies disclosed herein are directed to a cloud workload proxy as link-local service. According to one aspect disclosed herein, a datacenter environment system can include an infrastructure network, a service proxy gateway attached to the infrastructure network, and a software-defined networking ("SDN") controller. The service proxy gateway can include an infrastructure network address. The SDN controller can be configured with a link-local Internet protocol ("IP") address to the infrastructure network address. The SDN controller can store the link-local IP address mapped to the infrastructure network address for routing packets from a workload executing in a cloud computing environment to a target service operating external to the datacenter environment system.

18 Claims, 7 Drawing Sheets

(56) References Cited

U.S. PATENT DOCUMENTS

| | | | | |
|---|---|---|---|---|
| 7,181,612 B1* | 2/2007 | Pellacuru | H04L 29/12367 | 370/338 |
| 7,266,090 B2* | 9/2007 | Sawada | H04L 29/06 | 370/254 |
| 7,933,280 B2* | 4/2011 | Nagata | H04L 12/4641 | 370/401 |
| 8,478,902 B1* | 7/2013 | Holland | G06F 9/45533 | 709/238 |
| 8,660,129 B1* | 2/2014 | Brendel | H04L 12/4641 | 370/397 |
| 10,403,394 B2* | 9/2019 | Ansari | H04L 9/30 | |
| 2003/0212772 A1* | 11/2003 | Harris | H04L 29/12009 | 709/220 |
| 2003/0212795 A1* | 11/2003 | Harris | H04L 29/12009 | 709/227 |
| 2004/0028061 A1* | 2/2004 | Sawada | H04L 29/06 | 370/401 |
| 2005/0015507 A1* | 1/2005 | Chin | H04L 12/1836 | 709/230 |
| 2005/0157749 A1* | 7/2005 | Lee | H04L 29/06 | 370/466 |
| 2007/0058642 A1* | 3/2007 | Eisink | H04L 29/12009 | 370/401 |
| 2007/0171842 A1* | 7/2007 | Dow | H04L 29/12783 | 370/254 |
| 2010/0002652 A1* | 1/2010 | Kawakami | H04W 36/0011 | 370/331 |
| 2011/0103344 A1* | 5/2011 | Gundavelli | H04W 8/005 | 370/331 |
| 2011/0125882 A1* | 5/2011 | Khan | H04L 29/12254 | 709/221 |
| 2014/0122596 A1* | 5/2014 | Kim | H04L 67/10 | 709/204 |
| 2014/0317257 A1* | 10/2014 | Zhang | H04L 45/64 | 709/223 |
| 2014/0325090 A1* | 10/2014 | Michelin | H04L 61/103 | 709/245 |
| 2014/0328343 A1* | 11/2014 | Kapadia | H04L 45/741 | 370/392 |
| 2014/0366155 A1* | 12/2014 | Chang | G06F 21/10 | 726/27 |
| 2015/0270988 A1* | 9/2015 | Finkelstein | H04L 12/66 | 370/401 |
| 2015/0271268 A1* | 9/2015 | Finkelstein | H04L 67/12 | 370/400 |
| 2015/0296056 A1 | 10/2015 | Donley et al. | | |
| 2015/0334029 A1* | 11/2015 | Patil | H04L 67/06 | 370/235 |
| 2015/0370586 A1 | 12/2015 | Cooper et al. | | |
| 2016/0065461 A1* | 3/2016 | Zhang | H04L 45/64 | 709/223 |
| 2016/0099770 A1* | 4/2016 | Glottmann | H04W 40/24 | 370/316 |
| 2016/0294731 A1* | 10/2016 | McDaniel | H04L 41/0806 | |
| 2016/0330076 A1 | 11/2016 | Tiwari et al. | | |
| 2016/0337180 A1 | 11/2016 | Rao | | |
| 2016/0337329 A1* | 11/2016 | Sood | H04L 63/08 | |
| 2016/0373345 A1 | 12/2016 | Li et al. | | |
| 2016/0373474 A1* | 12/2016 | Sood | H04L 63/1425 | |
| 2017/0026283 A1* | 1/2017 | Williams | H04L 45/64 | |
| 2017/0041211 A1* | 2/2017 | Pandya | H04L 45/02 | |
| 2017/0181210 A1* | 6/2017 | Nadella | H04W 48/16 | |
| 2017/0331853 A1* | 11/2017 | Kawakita | H04L 63/1416 | |
| 2017/0346686 A1* | 11/2017 | Mudigonda | H04L 41/0806 | |
| 2017/0373990 A1* | 12/2017 | Jeuk | H04L 69/22 | |
| 2019/0199587 A1* | 6/2019 | Mudigonda | H04L 41/0806 | |

OTHER PUBLICATIONS

Ameigeiras et al., "Link-Level Access Cloud Architecture Design Based on SDN for 5G Networks," IEEE Network, vol. 29, Issue 2, Mar. 24, 2015, pp. 24-31.

* cited by examiner

CLOUD WORKLOAD PROXY AS LINK-LOCAL SERVICE CONFIGURED TO ACCESS A SERVICE PROXY GATEWAY VIA A LINK-LOCAL IP ADDRESS TO COMMUNICATE WITH AN EXTERNAL TARGET SERVICE VIA A PRIVATE NETWORK

BACKGROUND

Cloud computing can allow dynamically scalable, often virtualized resources to be provided as a service. Cloud computing can assure an appropriate level of resources are available to power software applications when and where the resources are needed in response to demand. As a result, cloud computing allows entities to respond quickly, efficiently, and in an automated fashion to the rapidly changing business environment.

Cloud-based software-defined networking ("SDN") services are being pursued by major telecommunications carriers around the world. Cloud-based SDN services allow customers to create and activate new services and to update existing services on-demand and in near real-time using resources available from a cloud environment. SDN provides "network-on-demand" services that allow network infrastructure to adapt to user demand.

Internet protocol ("IP") networking requires a device network interface to be configured with an IP address to enable communication with other devices. In some instances, address confirmation information might not be available. In these instances, the devices can utilize an IP networking function known as a link-local address to enable communication between devices connected to the same link. A link-local address is a network address that facilitates communication on a specific network segment, known as a "link." A link-local address is unusable beyond this link

SUMMARY

Concepts and technologies disclosed herein are directed to a cloud workload proxy as link-local service. According to one aspect disclosed herein, a datacenter environment system can include an infrastructure network, a service proxy gateway attached to the infrastructure network, and a software-defined networking ("SDN") controller. The service proxy gateway can include an infrastructure network address. The SDN controller can be configured with a link-local Internet protocol ("IP") address to the infrastructure network address. The SDN controller can store the link-local IP address mapped to the infrastructure network address for routing packets from a workload executing in a cloud computing environment to a target service operating external to the datacenter environment system.

In some embodiments, the datacenter environment system can include a cloud computing environment. The cloud computing environment can include a plurality of hardware resources. The service proxy gateway can be instantiated using at least a portion of the plurality of hardware resources.

In some embodiments, the cloud computing environment can include one or more virtual machines each operating on at least a further portion of the plurality of hardware resources. A virtual machine can include cloud workload. The cloud workload can include data to be sent to a target service that operates external to the infrastructure network. The cloud workload can initiate a link-local SDN service to configure the cloud workload for access to the service proxy gateway via the link-local address. The cloud workload can send packets associated with the data to the service proxy gateway via the link-local address. The service proxy gateway can receive the packets and forward the packets to the target service that operates external to the infrastructure network. In some embodiments, the target service is or includes a security service.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
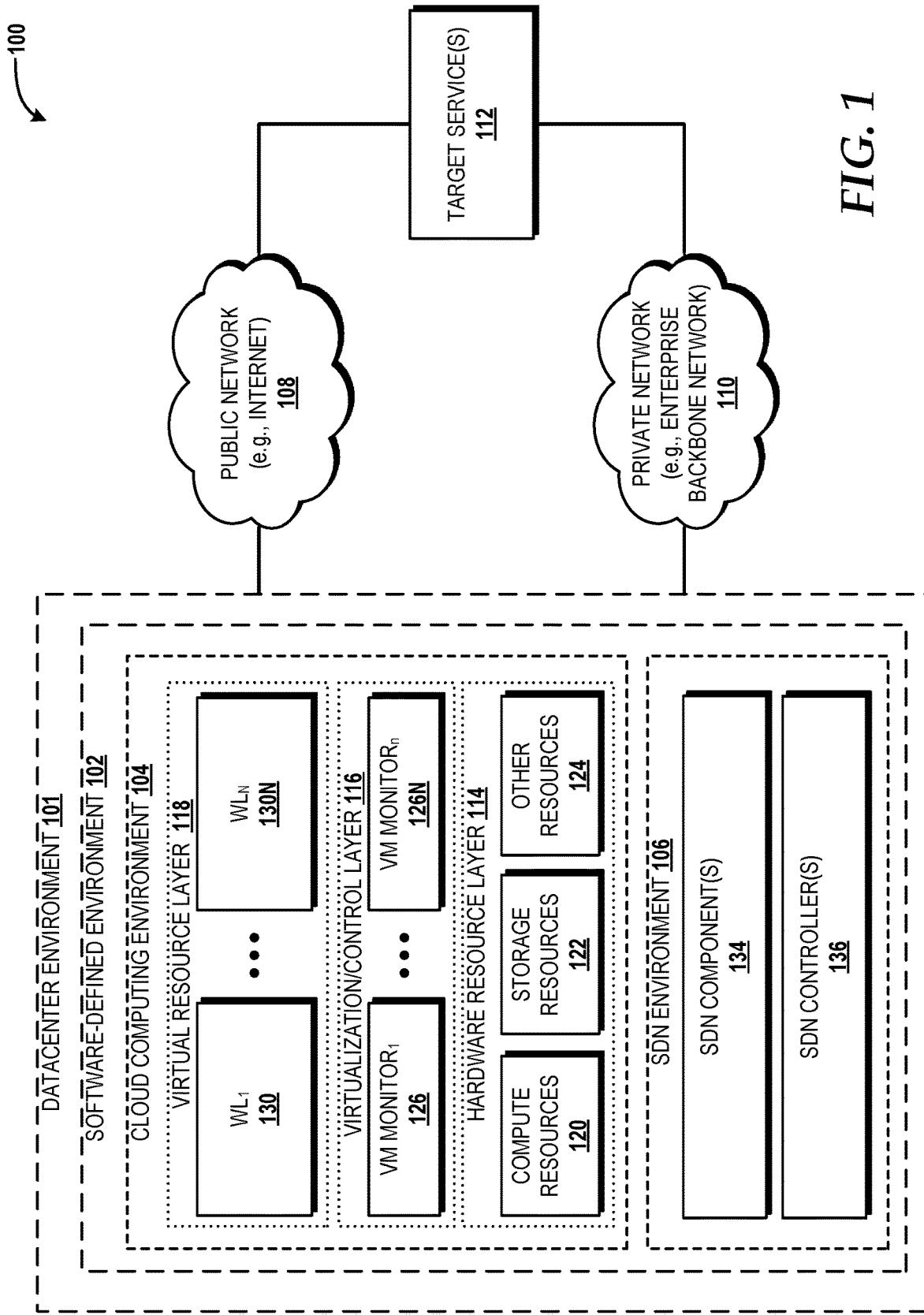
FIG. 1 is a block diagram illustrating aspects of an illustrative operating environment in which various concepts and technologies disclosed herein can be implemented.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of a cloud workload proxy as a link-local service will be presented.

Referring now to FIG. 1, aspects of an operating environment 100 for implementing various embodiments of the concepts and technologies disclosed herein will be described. The illustrated operating environment 100 includes a datacenter environment 101 that, in turn, encompasses a software-defined environment 102 that, in turn, encompasses a cloud computing environment 104 and a software-defined networking ("SDN") environment 106. The datacenter environment 101 can communicate with a public network 108, such as the public Internet, and a private network 110, such as an enterprise intranet or backbone network. The public network 108 and the private network 110 can allow the datacenter environment 101 access to one or more target services 112.

The software-defined environment 102 provides abstracted and virtualized compute, storage, and other resources via the cloud computing environment 104. The cloud computing environment 104 can support multiple services and applications. Those skilled in the art will appreciate the variety of services and applications that can be supported by the cloud computing environment 104, and as such, the example services and applications disclosed herein should not be construed as being limiting in any way. The illustrated cloud computing environment 104 includes a hardware resource layer 114, a virtualization/control layer 116, and a virtual resource layer 118. These layers 114, 116, 118 are defined merely for ease of explanation and in no way are intended to limit the functionality of the cloud computing environment 104 or the configuration thereof.

The hardware resource layer 114 provides hardware resources, which, in the illustrated embodiment, include one or more compute resources 120, one or more storage (memory) resources 122, and one or more other resources 124. The compute resources 120, the storage resources 122, the other resources 124, a portion thereof, and/or a combination thereof can be, in some embodiments, one or more physical compute hosts, such as one or more physical servers operating in the datacenter environment 101.

The compute resource(s) 120 can include one or more hardware components that perform computations to process data, and/or to execute computer-executable instructions of one or more application programs, operating systems, and/or other software. The compute resources 120 can include one or more central processing units ("CPUs") configured with one or more processing cores. The compute resources 120 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 120 can include one or more discrete GPUs. In some other embodiments, the compute resources 120 can include CPU and GPU components that are configured in accordance with a co-processing CPU/GPU computing model, wherein the sequential part of an application executes on the CPU and the computationally-intensive part is accelerated by the GPU. The compute resources 120 can include one or more system-on-chip ("SoC") components along with one or more other components, including, for example, one or more of the storage resources 122, and/or one or more of the other resources 124. In some embodiments, the compute resources 120 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 120 can be or can include one or more hardware components architected in accordance with an ARM architecture, available for license from ARM HOLDINGS of Cambridge, United Kingdom. Alternatively, the compute resources 120 can be or can include one or more hardware components architected in accordance with an x86 architecture, such an architecture available from INTEL CORPORATION of Mountain View, Calif., and others. Those skilled in the art will appreciate the implementation of the compute resources 120 can utilize various computation architectures, and as such, the compute resources 120 should not be construed as being limited to any particular computation architecture or combination of computation architectures, including those explicitly disclosed herein.

The storage resource(s) 122 can include one or more hardware components that perform storage operations, including temporary or permanent storage operations. In some embodiments, the storage resource(s) 122 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 120.

The other resource(s) 124 can include any other hardware resources that can be utilized by the compute resources(s) 120 and/or the storage resource(s) 122 to perform operations described herein. The other resource(s) 124 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like. Those skilled in the art will appreciate additional hardware resources that can be included as part of the other resources 124.

The hardware resources operating within the hardware resource layer 114 can be virtualized by one or more virtual machine monitors ("VMMs") 126-126N (also known as "hypervisors"; hereinafter "VMMs 126") operating within the virtualization/control layer 116 to manage one or more virtual resources that reside in the virtual resource layer 118. The VMMs 126 can be or can include software, firmware, and/or hardware that alone or in combination with other software, firmware, and/or hardware, manages one or more virtual resources operating within the virtual resource layer 118.

The virtual resources operating within the virtual resource layer 118 can include abstractions of at least a portion of the compute resources 120, the storage resources 122, the other resources 124, or any combination thereof. In the illustrated embodiment, the virtual resource layer 118 includes workloads 130-130N (hereinafter "workloads 130"). Each of the workloads 130 can be or can include a virtual machine or container. The workloads 130 can execute any processes, applications, executable instructions, services, or other "loads."

The software-defined environment 102 provides abstracted and virtualized network infrastructure resources via the SDN environment 106. The illustrated SDN environment 106 includes one or more SDN components 134 and one or more SDN controllers 136. The SDN controller(s) 136 can, on-demand, allocate resources from the cloud computing environment 104 to instantiate and manage the SDN components 134. The SDN components 134 can include one or more routers, one or more switches, one or more gateways, other networking components, or some combination thereof that form, at least in part, an infrastructure network through which the workloads 130 can communicate within the cloud computing environment 104 and with external services, such as the target service(s) 112. In some embodiments, the SDN components 134 utilize OpenFlow protocols and function as OpenFlow switches or OpenFlow routers, although the concepts and technologies disclosed herein are not limited to OpenFlow protocols.

The public network 108 can include the Internet and/or any other networks accessible by one or more Internet-capable devices and/or systems, including those operating as part of the software-defined environment 102. Communications over the public network 108 are not private, and therefore subject to monitoring. The private network 110 can include any private network, but will be described in the context of an enterprise backbone network through which workloads 130 executed in the cloud-computing environment 104 can communicate privately with the target service(s) 112. Those skilled in the art will appreciate the variety of configurations, protocols, and other network characteristics implemented by the private network 110. As such, the private network 110 is not limited to any particular configuration, protocol, or other network characteristic(s), other than enabling a private connection to the target service(s) 112.

Figure 2:
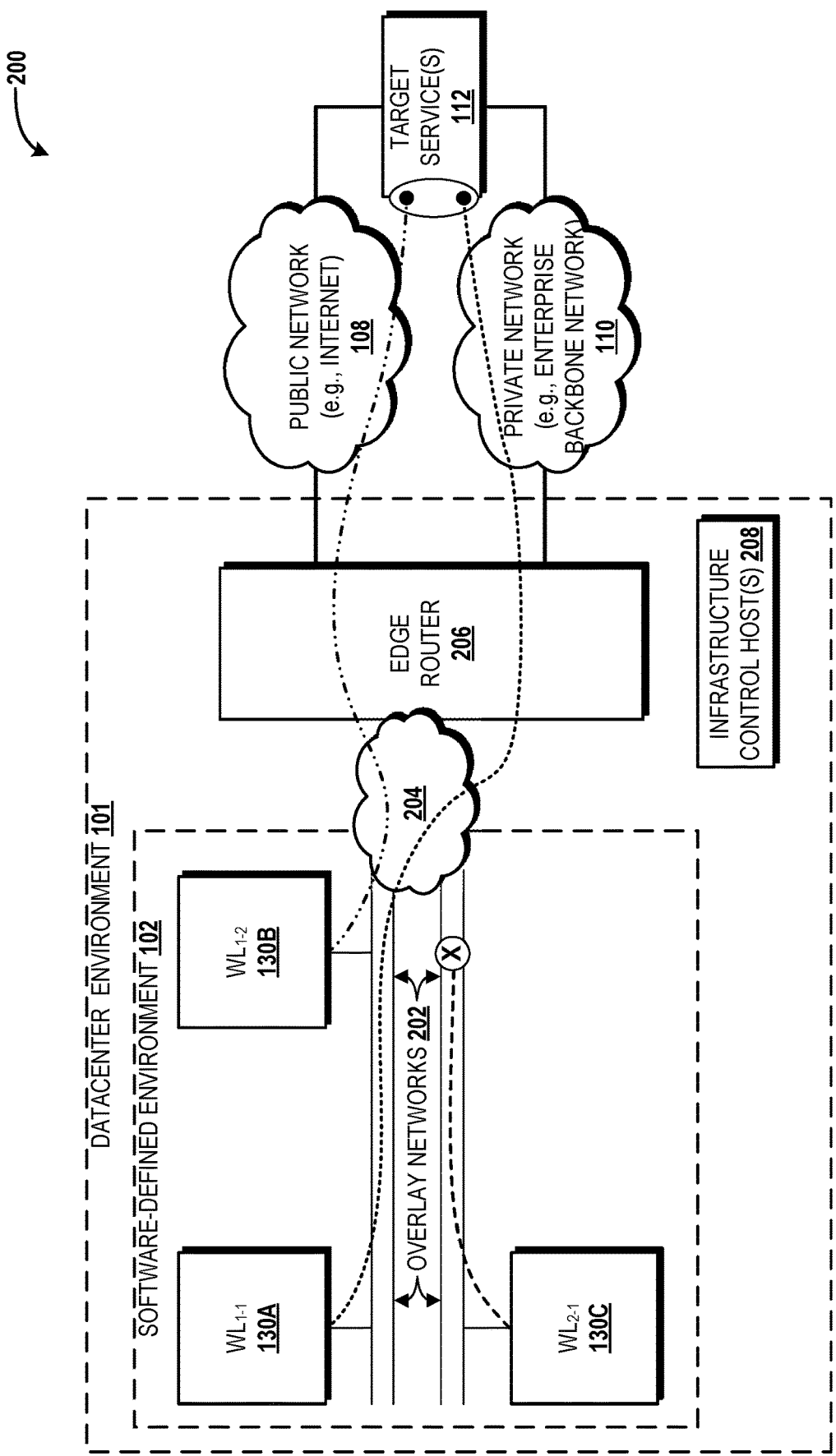
FIG. 2 is a block diagram illustrating an implementation of a datacenter environment for facilitating communications between some cloud workloads in a software-defined environment and a target service external to the software-defined environment and another cloud workload that is incapable of communicating with the target service.

Turning now to FIG. 2, an implementation 200 of the datacenter environment 101 for facilitating communications between some of the workloads 130 and the target service(s) 112 will be described. The illustrated implementation 200 includes three workloads 130A-130C. The workloads 130A-130C can communicate with one another via one or more overlay networks 202. The overlay networks 202 can be constructs of the SDN environment 106 implemented via the SDN component(s) 134 and the SDN controller(s) 136. The overlay network(s) 202 can include one or more virtual or logical links built on top of an underlay (infrastructure) network 204, which represents the physical network of the datacenter environment 101. The underlay network 204 connects the overlay network 202 to one or more edge routers 206. The edge router(s) 206 operate at the edge of the underlay network 204 and facilitate ingress/egress traffic from the datacenter environment 101 to outside networks, such as the public network 108 and the private network 110. The illustrated datacenter environment 101 also includes one or more infrastructure control hosts 208 that manage the software-defined environment 102, including the cloud computing environment 104 and the SDN environment 106. The SDN environment 106 provides routing functions for the overlay network(s) 202 utilizing the underlay network 204 to route packets between compute resources operating in the cloud computing environment 104, the edge router(s) 206, and the infrastructure control hosts 208.

In the illustrated implementation 200, the workload$_{1-1}$ 130A and the workload$_{1-2}$ 130B have viable communication paths to the target service(s) 112 as provided by the configuration of the components within the SDN environment 106. The workload$_{1-1}$ 130A can send packets through the overlay network(s) 202 and the underlay network 204 to the edge router 206 that interfaces with the private network 110 through which the target service(s) 112 can receive the packets and respond as appropriate in the reverse manner. The workload$_{1-2}$ 130B can send packets through the overlay network(s) 202 (which might be the same or different from the overlay network(s) utilized by the workload$_{1-1}$ 130A) and the underlay network 204 to the edge router 206 that interfaces with the public network 108 through which the target service(s) 112 can receive the packets and responds as appropriate in the reverse manner. In other words, the workload$_{1-1}$ 130A can be configured with private network access to the target service(s) 112, while the workload$_{1-2}$ 130B can be configured with public network access to the target service(s) 112. Moreover, the workload$_{2-1}$ 130C has no viable external access provided by the configuration of components within the SDN environment 106, as shown by the terminating communication path in the illustrated example.

Figure 3:
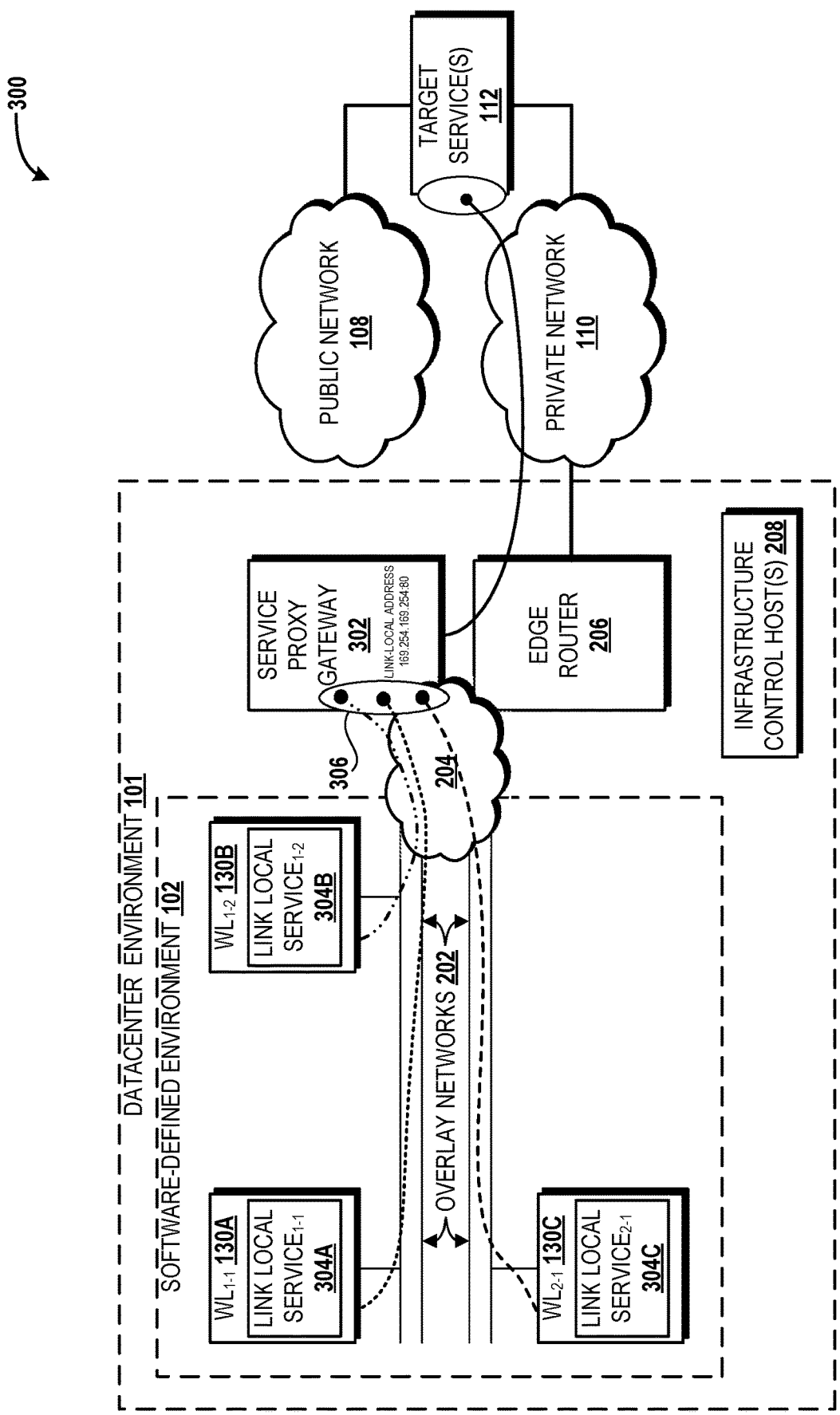
FIG. 3 is a block diagram illustrating an improved implementation of a datacenter environment for facilitating communications between all cloud workloads in a software-defined environment and a target service external to the software-defined environment, according to an illustrative embodiment.

Turning now to FIG. 3, an improved implementation 300 of the datacenter environment 101 for facilitating communications between all of the workloads 130 and the target service(s) 112 will be described. The illustrated improved implementation 300 includes the same three workloads 130A-130C as described above in the implementation 200 shown in FIG. 2.

The improved implementation 300 also includes a service proxy gateway 302. The service proxy gateway 302 provides each of the workloads 130 access to the target services 112 via the private network 110 irrespective of the IP protocol reachability of the network to which the workloads 130 are connected. Returning to the implementation 200 shown in FIG. 2, the workload$_{1-2}$ 130B is shown configured with public network access to the target service(s) 112, and the workload$_{2-1}$ 130C is shown as having no external access. These limitations are dictated by the capabilities of the overlay network(s) 202 to which these workloads 130 are connected. That is, the overlay network 202 to which the workload$_{1-2}$ 130B is connected does not support external access via the private network 110, and the overlay network 202 to which the workload$_{2-1}$ 130C is connected does not support access beyond the overlay network 202, and as such, cannot access the target service(s) 112 via the public network 108 or the private network 110.

In the illustrated improved implementation 300, the workload$_{1-1}$ 130A, the workload$_{1-2}$ 130B, and the workload$_{2-1}$ 130C all have viable communication paths to the target service(s) 112 facilitated, in part, by the service proxy gateway 302 and instances of a link-local service 304 utilized by each of the workloads 130 to configure access to the service proxy gateway 302 via a link-local IP address 306. In this manner, the workloads 130 can address outgoing packets to and receive incoming packets from the service proxy gateway 302 via the link-local IP address 306. The link-local IP address 306 can operate in accordance IPv4 and/or IPv6 protocols depending upon the needs of the workloads 130. Providing the service proxy gateway 302 service on an IPv4/6 protocol link-local address (306) to the workloads 130 in the datacenter environment 101 enables these workloads 130, or at least a portion thereof, to communicate with the target service(s) 112 irrespective of the IP protocol reachability of the network to which the workloads 130 are connected. The SDN environment 106 provides network address translation ("NAT") services required to route link-local addresses (306) on the overlay network(s) 202 to the service proxy gateway 302.

The workloads 130 in the cloud computing environment 104 can be connected to one or more virtual networks (e.g., the overlay networks 202) that are isolated to within the cloud computing environment 104 or a particular cloud tenant served by the cloud computing environment 104. This isolation renders unusable the use of software agents to access services, such as the target service(s) 112, external to the cloud computing environment 104. The improved implementation 300 solves this problem through the service proxy gateway 302, the link-local service 304 and the link-local IP address 306 described above.

In some embodiments, the target service(s) 112 include a security service. The service proxy gateway 302 implemented to provide the workloads 130 access to the security service via the link-local IP address 306 can enable better and more customizable security for the workloads 130. For example, a cloud tenant might desire to utilize the cloud computing environment 104 for compute workloads, but desire to utilize an external security solution, either because the desired security solution is unavailable through the cloud computing environment 104, due to specific security requirements that dictate and off-site security solution, or for some other reason.

Figure 4:
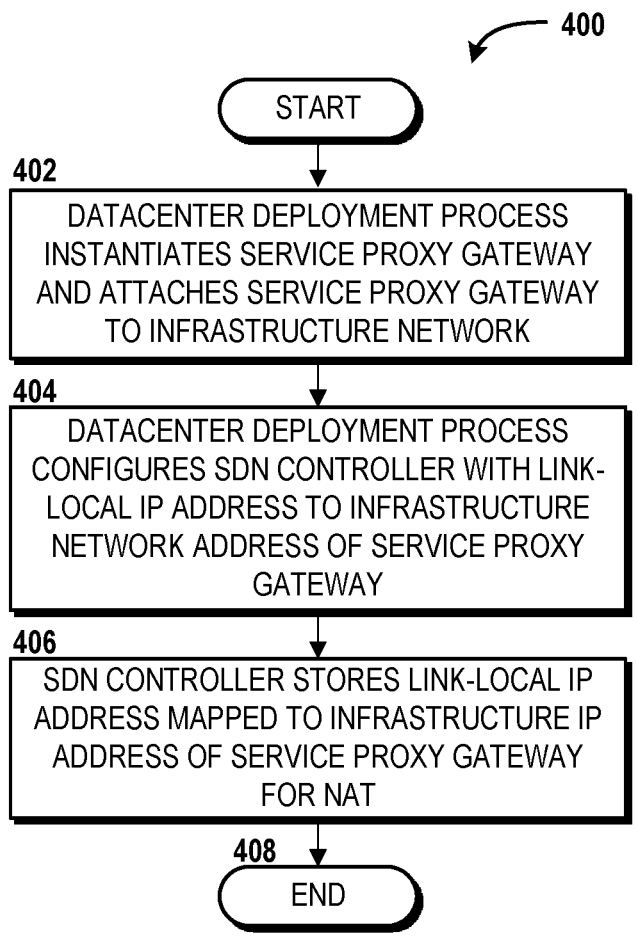
FIG. 4 is a flow diagram illustrating aspects of a method for deploying a service proxy gateway in a datacenter environment, according to an illustrative embodiment.

Turning now to FIG. 4, aspects of a method 400 for deploying the service proxy gateway 302 in the datacenter environment 101 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the compute resources 120 of the cloud computing environment 104 and/or a processor of one or more other computing systems and/or devices disclosed herein to perform operations.

For purposes of illustrating and describing some of the concepts of the present disclosure, the methods disclosed herein are described as being performed, at least in part, by the compute resources 120 of the cloud computing environment 104 described herein above with reference to FIG. 1, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described with reference to FIGS. 3 and 4. The method 400 begins and proceeds to operation 402, where a datacenter deployment process instantiates the service proxy gateway 302 within the datacenter environment 101 and attaches the service proxy gateway 302 to the underlay/infrastructure network 204. From operation 402, the method 400 proceeds to operation 404, where the datacenter deployment process configures the SDN controller 136 with the link-local IP address (306) to the infrastructure network address of the service proxy gateway 302. From operation 404, the method 400 proceeds to operation 406, where the SDN controller 136 stores the link-local IP address mapped to the infrastructure IP address of the service proxy gateway 302 for NAT. From operation 406, the method 400 proceeds to operation 408, where the method 400 ends.

Figure 5:
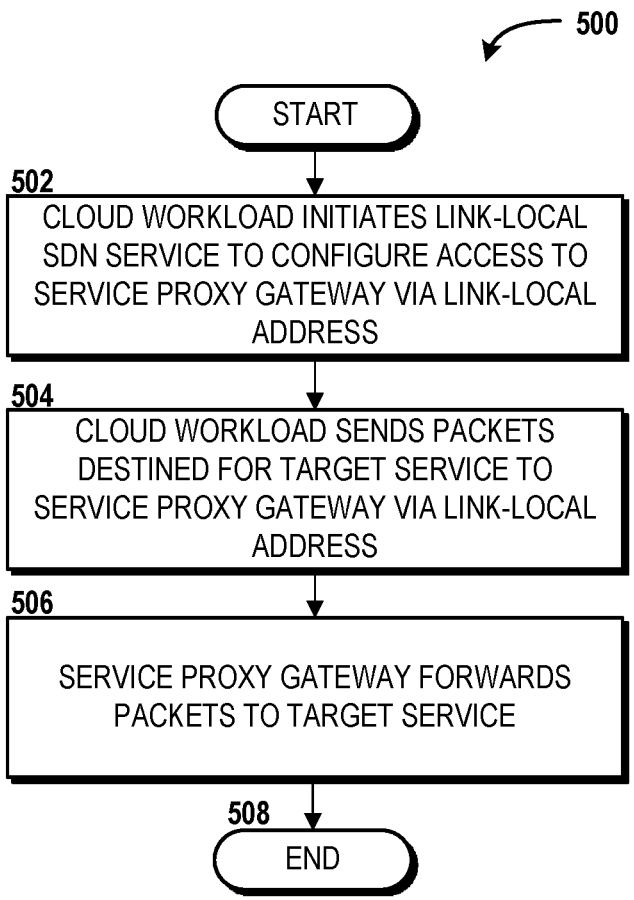
FIG. 5 is a flow diagram illustrating aspects of a method for routing network traffic towards a target service via a link-local address, according to an illustrative embodiment.

Turning now to FIG. 5, aspects of a method 500 for routing network traffic towards the target service 112 via the link-local address 306 will be described in detail, according to an illustrative embodiment. Providing an IPv4/6 link-local IP address (e.g., the link-local address 306) to reach the target service 112 to cloud workload agents operating in the workloads 130 in the cloud computing environment 104 enables communication no matter the IP protocol reachability of the network to which the workload 130 is connected. Additionally, the link-local address 306 is a known address enabling the agents on the workloads 130 to use the link-local address 306 as a default proxy gateway address without additional configuration. In this manner, configuration of the cloud workload agents for access to the target service 112 is greatly simplified.

The method 500 will be described with reference to FIGS. 3 and 5. The method 500 begins and proceeds to operation 502, where the cloud workload 130 initiates a link-local service 304 to configure access to the service proxy gateway 302 via a link-local IP address 306. From operation 502, the method 500 proceeds to operation 504, where the cloud workload 130 sends packets destined for the target service 112 to the service proxy gateway 302 via the link-local address 306. More particularly, the SDN controller 136 modifies the source (virtual network—cloud workload 130) and destination (service proxy gateway 302) IP addresses to that of the infrastructure's NAT router and the proxy gateway's infrastructure IP address. The SDN controller 136 then forwards the packets into the infrastructure network towards the service proxy gateway 302. In reverse, the SDN controller 136 performs the reverse translation. From operation 504, the method 500 proceeds to operation 506, where the service proxy gateway 302 forwards the packets to the target service 112. From operation 506, the method 500 proceeds to operation 508, where the method 500 ends.

Figure 6:
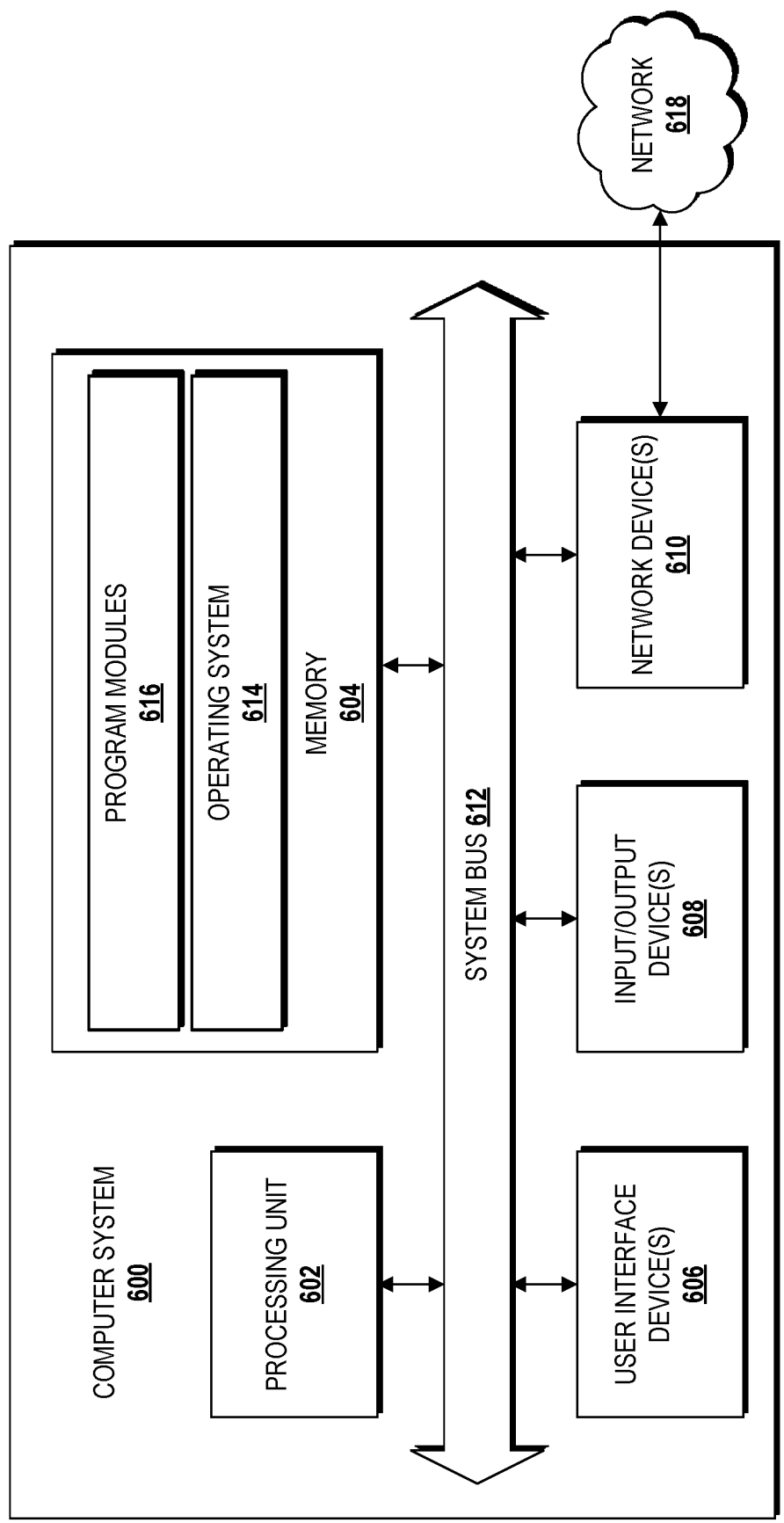
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some implementations, the hardware resource layer 114 (best illustrated in FIG. 1) can include one or more computer systems configured like the architecture of the computer system 600. It should be understood, however, that modification to the architecture may be made to facilitate certain interactions among elements described herein. In some implementations, the compute resources 120, the storage resources 122, and/or the other resources 124 can be combined so as to be configured like the architecture of the computer system 600 or portions thereof.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 120 can include one or more processing units 602.

The memory 604 communicates with the processing unit 602 via the system bus 612. In some embodiments, the memory 604 is operatively connected to a memory controller (not shown) that enables communication with the processing unit 602 via the system bus 612. The storage resources 122 can include one or more instances of the memory 604. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be a wired network such as, but not limited to, a Wide Area Network ("WAN"), a wired Personal Area Network ("PAN"), or a wired Metropolitan Area Network ("MAN"). The network 618 may be any other network described herein.

Figure 7:
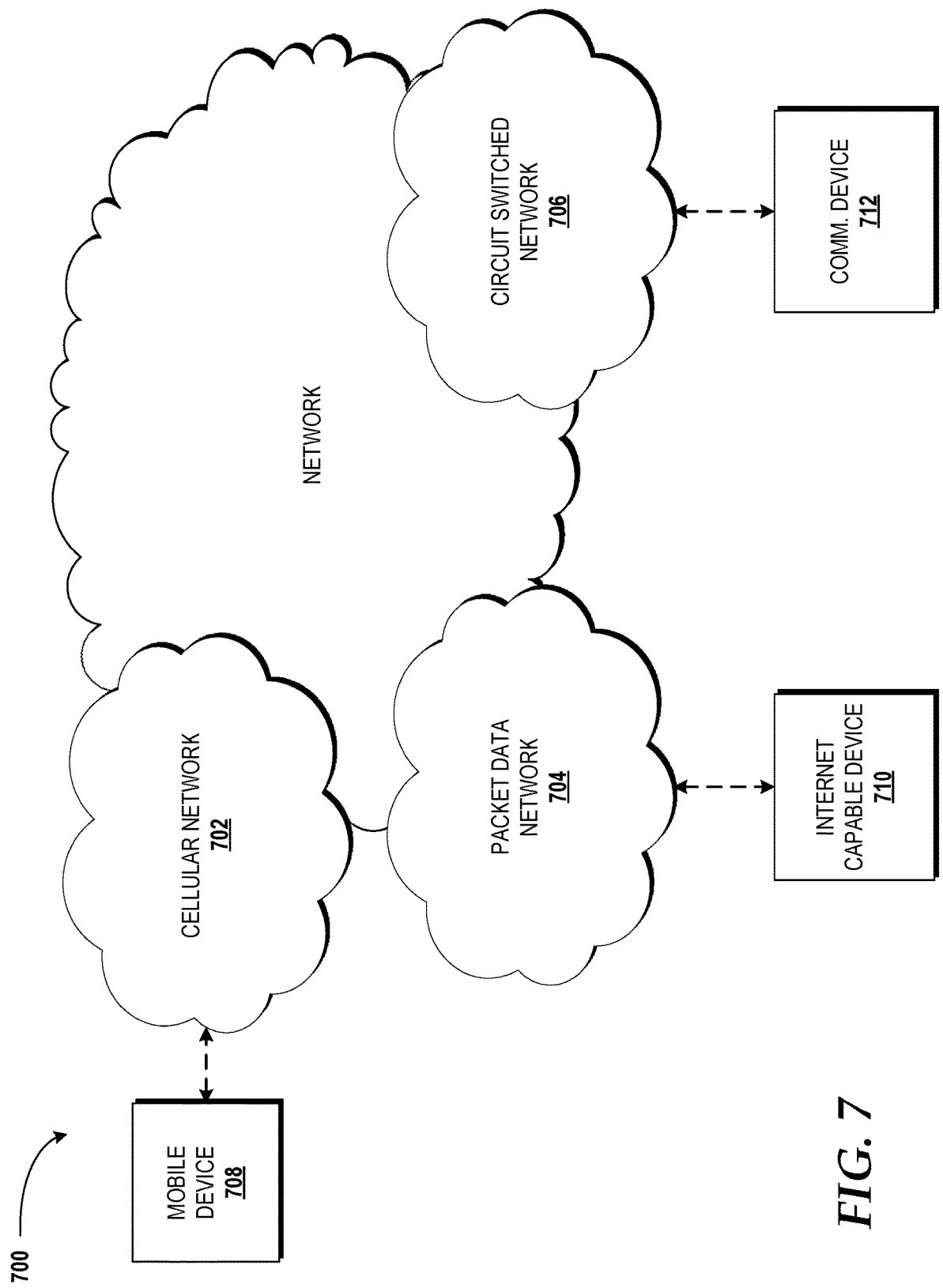
FIG. 7 is a diagram illustrating a network, according to an illustrative embodiment.

Turning now to FIG. 7, details of a network 700 are illustrated, according to an illustrative embodiment. The network 700 includes a cellular network 702, a packet data network 704, for example, the Internet, and a circuit switched network 706, for example, a public switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G Global System for Mobile communications ("GSM") network and can provide data communications via General Packet Radio Service ("GPRS") and/or Enhanced Data rate for GSM Evolution ("EDGE"). Additionally, or alternatively, the cellular network 702 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced Uplink ("EUL"), also referred to as High-Speed Uplink Packet Access ("HSUPA"), and HSPA+. The cellular network 702 also is compatible with 4G mobile communications standards such as Long-Term Evolution ("LTE"), or the like, as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a Plain Old Telephone System ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, the unmanaged TDM device 106, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 700 is used to refer broadly to any combination of the networks 702, 704, 706. It should be appreciated that substantially all of the functionality described with reference to the software-defined environment 102, the public network 108, the private network 110 can be in communication and/or incorporated into one or more of the cellular network 702, the packet data network 704, and/or the circuit switched network 706, alone or in combination with other networks, network elements, and the like.

Based on the foregoing, it should be appreciated that concepts and technologies directed to a cloud workload proxy as link-local service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:
1. A datacenter environment system comprising:
an overlay network;
an infrastructure network;
a plurality of cloud workloads connected to the overlay network, wherein
a first cloud workload of the plurality of cloud workloads has access through the overlay network and a public network to a target service that is external to the datacenter environment system,
a second cloud workload of the plurality of cloud workloads has access through the overlay network and a private network to the target service that is external to the datacenter environment system, and
a third cloud workload of the plurality of cloud workloads does not have access through the overlay network and either the public network or the private network to the target service external to the datacenter environment system;
a processor; and
a memory comprising computer-executable instructions that, when executed by the processor, cause the processor to perform operations comprising
  instantiating a service proxy gateway within the datacenter environment system, wherein the service proxy gateway is attached to the infrastructure network and comprises an infrastructure network IP address,
  configuring a software-defined network controller with a link-local IP address mapped to the infrastructure IP address of the service proxy gateway, and
  instantiating a first instance of a link-local service on the first cloud workload, a second instance of the link-local service on the second cloud workload, and a third instance of the link-local service on the third cloud workload, wherein the link-local service configures the first cloud workload, the second cloud workload, and the third cloud workload with access to the service proxy gateway via the link-local IP address to enable each of the first cloud workload, the second cloud workload, and the third cloud workload to communicate with the target service external to the datacenter environment system via the private network.

2. The datacenter environment system of claim 1, further comprising a cloud computing environment comprising a plurality of hardware resources; wherein the plurality of hardware resources comprise the processor and the memory; and wherein the service proxy gateway is instantiated using at least a portion of the plurality of hardware resources.

3. The datacenter environment system of claim 2, wherein the plurality of cloud workloads operate on at least a further portion of the plurality of hardware resources.

4. The datacenter environment system of claim 3, wherein at least one the first cloud workload, the second cloud workload, and the third cloud workload comprises data to be sent to the target service.

5. The datacenter environment system of claim 4, wherein the at least one of the first cloud workload, the second cloud workload, and the third cloud workload, when executed, performs operations comprising sending packets associated with the data to the service proxy gateway via the link-local IP address.

6. The datacenter environment system of claim 5, wherein the service proxy gateway performs operations comprising forwards the packets to the target service.

7. The datacenter environment system of claim 6, wherein the target service comprises a security service.

8. A method comprising:
  instantiating, by a datacenter environment system, a service proxy gateway attached to an infrastructure network, wherein the service proxy gateway comprises an infrastructure network IP address;
  configuring, by the datacenter environment system, a software-defined network controller with a link-local IP address mapped to the infrastructure IP address of the service proxy gateway; and
  instantiating, by the datacenter environment system, a first instance of a link-local service on a first cloud workload of a plurality of cloud workloads, a second instance of the link-local service on a second cloud workload of the plurality of cloud workloads, and a third instance of the link-local service on a third cloud workload of the plurality of cloud workloads, wherein the first cloud workload of the plurality of cloud workloads has access through an overlay network and a public network to a target service that is external to the datacenter environment system, wherein the second cloud workload of the plurality of cloud workloads has access through the overlay network and a private network to the target service that is external to the datacenter environment system, wherein the third cloud workload of the plurality of cloud workloads does not have access through the overlay network and either the public network or the private network to the target service external to the datacenter environment system, and wherein the link-local service configures the first cloud workload, the second cloud workload, and the third cloud workload with access to the service proxy gateway via the link-local IP address to enable each of the first cloud workload, the second cloud workload, and the third cloud workload to communicate with the target service external to the datacenter environment system via the private network.

9. The method of claim 8, wherein instantiating the service proxy gateway comprises instantiating the service proxy gateway using at least a portion of a plurality of hardware resources of a cloud computing environment.

10. The method of claim 9, wherein the plurality of cloud workloads operate on at least a further portion of the plurality of hardware resources of the cloud computing environment.

11. The method of claim 10, wherein at least one of the first cloud workload, the second cloud workload, and the third cloud workload comprises data to be sent to the target service.

12. The method of claim 11, further comprising sending, by the at least one of the first cloud workload, the second cloud workload, and the third cloud workload, packets associated with the data to the service proxy gateway via the link-local IP address.

13. The method of claim 12, further comprising forwarding, by the service proxy gateway, the packets to the target service.

14. A computer-readable storage medium having instructions stored thereon that, when executed by at least a portion of a plurality of hardware components of a cloud computing environment, cause the portion of the plurality of hardware components to perform operations comprising:
  instantiating a service proxy gateway attached to an infrastructure network, wherein the service proxy gateway comprises an infrastructure network IP address;
  configuring a software-defined network controller with a link-local IP address mapped to the infrastructure IP address of the service proxy gateway; and
  instantiating a first instance of a link-local service on a first cloud workload of a plurality of cloud workloads, a second instance of the link-local service on a second cloud workload of the plurality of cloud workloads, and a third instance of the link-local service on a third cloud workload of the plurality of cloud workloads, wherein the first cloud workload of the plurality of cloud workloads has access through an overlay network and a public network to a target service that is external to the datacenter environment system, wherein the second cloud workload of the plurality of cloud workloads has access through the overlay network and a private network to the target service that is external to a datacenter environment system, wherein the third cloud workload of the plurality of cloud workloads does not have access through the overlay network and either the public network or the private network to the target service external to the datacenter environment system, and wherein the link-local service configures the first cloud workload, the second cloud workload, and the third cloud workload with access to the service proxy gateway via the link-local IP address to enable each of the first cloud workload, the second cloud workload, and the third cloud workload to communicate with the target service external to the datacenter environment system via the private network.

15. The computer-readable storage medium of claim 14, wherein at least one of the first cloud workload, the second cloud workload, and the third cloud workload comprises data to be sent to the target service external to the infrastructure network.

16. The computer-readable storage medium of claim 15, wherein the target service comprises a security service.

17. The computer-readable storage medium of claim 15, wherein the operations further comprise sending packets associated with the data to the service proxy gateway via the link-local IP address.

18. The computer-readable storage medium of claim 17, wherein the operations further comprise forwarding the packets to the target service.

* * * * *